(12) United States Patent
Zapf et al.

(10) Patent No.: US 11,704,916 B2
(45) Date of Patent: Jul. 18, 2023

(54) THREE-DIMENSIONAL ENVIRONMENT ANALYSIS METHOD AND DEVICE, COMPUTER STORAGE MEDIUM AND WIRELESS SENSOR SYSTEM

(71) Applicant: Robert Bosch GmbH, Stuttgart (DE)

(72) Inventors: Marc Patrick Zapf, Shanghai (CN); William Wang, Shanghai (CN); Hao Sun, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 17/359,589

(22) Filed: Jun. 27, 2021

(65) Prior Publication Data

US 2021/0406515 A1 Dec. 30, 2021

(30) Foreign Application Priority Data

Jun. 30, 2020 (CN) .......................... 202010610963.9

(51) Int. Cl.
*G06T 17/05* (2011.01)
*G06T 15/06* (2011.01)
*G06V 20/64* (2022.01)
*G06T 15/50* (2011.01)

(52) U.S. Cl.
CPC .............. *G06V 20/64* (2022.01); *G06T 15/06* (2013.01); *G06T 15/506* (2013.01); *G06T 17/05* (2013.01); *G06T 2200/24* (2013.01)

(58) Field of Classification Search
CPC ........ G06T 15/06; H04W 16/18; H04W 16/20
See application file for complete search history.

(56) References Cited

U.S. PATENT DOCUMENTS

| | | | | |
|---|---|---|---|---|
| 6,366,242 B1* | 4/2002 | Boyd | .......................... | G01S 5/04 342/450 |
| 6,771,932 B2* | 8/2004 | Caminiti | ................ | H04W 16/18 455/67.14 |
| 8,400,448 B1* | 3/2013 | Doyle, Jr. | ................ | G06T 15/04 345/419 |
| 2008/0122834 A1* | 5/2008 | Ouzana | .................... | G06T 19/00 345/419 |
| 2017/0142405 A1* | 5/2017 | Shors | ...................... | G01C 11/04 |
| 2018/0176797 A1* | 6/2018 | Barros | .................... | H01Q 19/10 |
| 2020/0349761 A1* | 11/2020 | Zhang | ...................... | G06T 15/10 |

* cited by examiner

*Primary Examiner* — Ryan McCulley
(74) *Attorney, Agent, or Firm* — Maginot, Moore & Beck LLP

(57) ABSTRACT

A three-dimensional environment analysis method is disclosed. The method includes (i) receiving original point cloud data of a working environment, (ii) processing a map constructed on the basis of the original point cloud data in order to separate out a ground surface, a wall surface and an obstacle in the working environment, (iii) pairing the ground surface with the wall surface according to the degree of proximity between the ground surface and wall surface that are separated out to form one or more adjacent ground-wall pair sets, and (iv) subjecting the one or more adjacent ground-wall pair sets to ray tracing analysis in order to obtain a line-of-sight zone and a non-line-of-sight zone in the working environment. A three-dimensional environment analysis device, a computer storage medium and a wireless sensor system is also disclosed.

18 Claims, 2 Drawing Sheets

THREE-DIMENSIONAL ENVIRONMENT ANALYSIS METHOD AND DEVICE, COMPUTER STORAGE MEDIUM AND WIRELESS SENSOR SYSTEM

This application claims priority under 35 U.S.C. § 119 to patent application no. 202010610963.9, filed on Jun. 30, 2020 in China, the disclosure of which is incorporated herein by reference in its entirety.

The present disclosure relates to a three-dimensional environment analysis solution, in particular to a three-dimensional environment analysis method and device, a computer storage medium and a wireless sensor system.

BACKGROUND

When a wireless signal propagation system is set up in a complex environment, a non-line-of-sight (NLOS) situation will arise between an anchor point and a connected device (e.g. a localized tag connected to an anchor in a UWB system, a mobile computer connected to a WiFi anchor, etc.) during wireless connection. This will generally result in a drop in system performance, or even inability to operate normally. For example, in a UWB (Ultra Wide Band) system, when an NLOS situation exists between a localized tag and a UWB anchor mounted on a wall, the system is unable to accurately track the position of the UWB tag.

NLOS situations are avoided as much as possible not only in UWB wireless sensor systems, but also in other systems requiring a line of sight (LOS) between the sensor or anchor and the tracked device for optimal functionality. For example, in a scenario in which multiple surveillance cameras are installed to cover an environment or WiFi system, etc. to the maximum extent, NLOS will result in a drop in system performance.

When a wireless sensor system is initially set up, it is necessary to perform a large number of manual measurements and to carefully select anchor (or sensor) installation points, in order to minimize the occurrence of NLOS during use of the system. In complex environments with unusual structures, it is very difficult to judge the optimal installation points in advance.

Thus, an improved three-dimensional environment analysis solution is desired, to aid the user in setting up a wireless sensor system more conveniently.

SUMMARY

According to an aspect of the present disclosure, a three-dimensional environment analysis method is provided, the method comprising: receiving original point cloud data of a working environment; processing a map constructed on the basis of the original point cloud data, in order to separate out a ground surface, a wall surface and an obstacle in the working environment; pairing the ground surface with the wall surface according to the degree of proximity between the ground surface and wall surface that are separated out, to form one or more adjacent ground-wall pair sets; and subjecting the one or more adjacent ground-wall pair sets to ray tracing analysis, in order to obtain a line-of-sight zone and a non-line-of-sight zone in the working environment.

Optionally, in the method described above, the step of receiving original point cloud data of a working environment comprises: receiving original point cloud data generated by a laser detection and ranging system or a depth camera.

Optionally, in the method described above, the step of processing a map constructed on the basis of the original point cloud data comprises: using a SLAM technique to process the original point cloud data so as to construct a 3D map of the working environment; subjecting the map to pre-processing, in order to remove noise and/or abnormal values; and segmenting the pre-processed map, in order to extract a ground surface, a wall surface and an obstacle in the working environment.

Optionally, in the method described above, the step of subjecting the one or more adjacent ground-wall pair sets to ray tracing analysis comprises: for each of n wall points on the wall surface in each pair set, tracing m light rays from said each wall point to m points on the ground surface in said each pair set; if no obstacle and no wall surface is encountered in the course of transmission of a first of them light rays, then said first light ray is identified as being line-of-sight transmitted; and if an obstacle or wall surface is encountered in the course of transmission of a second of the m light rays, then said second light ray is identified as being non-line-of-sight transmitted.

Optionally, in the method described above, the step of subjecting the one or more adjacent ground-wall pair sets to ray tracing analysis further comprises: for each of the n wall points, acquiring the numbers and lengths of light rays identified as being line-of-sight transmitted and non-line-of-sight transmitted respectively.

Optionally, the method described above may further comprise: visualizing the ground surface, wall surface and obstacle in a graphical user interface for a user to browse and mark.

Optionally, the method described above may further comprise: for a three-dimensional point or three-dimensional region in the working environment that is selected by a user, graphically displaying the line-of-sight zone and non-line-of-sight zone.

Optionally, the method described above may further comprise: based on the ray tracing analysis, calculating and outputting an ideal anchor point position on the wall surface, the ideal anchor point position being capable of minimizing the number of non-line-of-sight situations in a pre-selected region in the entire working environment.

Optionally, the method described above may further comprise: based on the ray tracing analysis, providing a statistical analysis of the relationship between the number/installation positions of deployed anchor points on the wall surface and the area ratio of the non-line-of-sight region to the line-of-sight region.

Optionally, in the method described above, the ideal anchor point position on the wall surface is calculated and outputted on the basis of the ray tracing analysis in conjunction with a limiting condition set by a user.

According to another aspect of the present disclosure, a three-dimensional environment analysis device is provided, the device comprising: a receiving module, for receiving original point cloud data of a working environment; a processing module, for processing a map constructed on the basis of the original point cloud data, in order to separate out a ground surface, a wall surface and an obstacle in the working environment; a pairing module, for pairing the ground surface with the wall surface according to the degree of proximity between the ground surface and wall surface that are separated out, to form one or more adjacent ground-wall pair sets; and an analysis module, for subjecting the one or more adjacent ground-wall pair sets to ray tracing analysis, in order to obtain a line-of-sight zone and a non-line-of-sight zone in the working environment.

Optionally, in the device described above, the receiving module is configured to receive original point cloud data generated by a laser detection and ranging system or a depth camera.

Optionally, in the device described above, the processing module comprises: a constructing module, for using a SLAM technique to process the original point cloud data so as to construct a 3D map of the working environment; a pre-processing module, for subjecting the original point cloud data to pre-processing, in order to remove noise and/or abnormal values; and a point cloud segmenting module, for segmenting the pre-processed point cloud data, in order to extract a ground surface, a wall surface and an obstacle in the working environment.

Optionally, in the device described above, the analysis module is configured to trace, for each of n wall points on the wall surface in each pair set, m light rays from said each wall point to m points on the ground surface in said each pair set; if no obstacle and no wall surface is encountered in the course of transmission of a first of them light rays, then said first light ray is identified as being line-of-sight transmitted; and if an obstacle or wall surface is encountered in the course of transmission of a second of the m light rays, then said second light ray is identified as being non-line-of-sight transmitted.

Optionally, in the device described above, the analysis module is further configured to acquire, for each of the n wall points, the numbers and lengths of light rays identified as being line-of-sight transmitted and non-line-of-sight transmitted respectively.

Optionally, the device described above may further comprise: a first graphical display module, for visualizing the ground surface, wall surface and obstacle in a graphical user interface for a user to browse and mark.

Optionally, the device described above may further comprise: a second graphical display module, for graphically displaying the line-of-sight zone and non-line-of-sight zone for a three-dimensional point or three-dimensional region in the working environment that is selected by a user.

Optionally, the device described above may further comprise: a calculating module, for calculating and outputting an ideal anchor point position on the wall surface on the basis of the ray tracing analysis, the ideal anchor point position being capable of minimizing the number of non-line-of-sight situations in a pre-selected region in the entire working environment.

Optionally, the device described above may further comprise: a statistical analysis module, for providing, based on the ray tracing analysis, a statistical analysis of the relationship between the number/installation positions of deployed anchor points on the wall surface and the area ratio of the non-line-of-sight region to the line-of-sight region.

Optionally, in the device described above, the calculating module is configured to calculate and output the ideal anchor point position on the wall surface on the basis of the ray tracing analysis in conjunction with a limiting condition set by a user.

According to another aspect of the present disclosure, a computer storage medium is provided, the medium comprising instructions which, when run, execute the three-dimensional environment analysis method as described above.

According to another aspect of the present disclosure, a wireless sensor system is provided, comprising the three-dimensional environment analysis device as described above.

In summary, the three-dimensional environment analysis solution of the present disclosure can help the user to set up a wireless sensor system faster and more conveniently.

BRIEF DESCRIPTION OF THE DRAWINGS

The following detailed description in conjunction with the drawings will make the abovementioned and other objectives and advantage of the present disclosure more complete and clear, wherein identical or similar key elements are indicated with identical labels.

DETAILED DESCRIPTION

The three-dimensional environment analysis solution according to various exemplary embodiments of the present disclosure is described in detail below with reference to the drawings.

Figure 1:
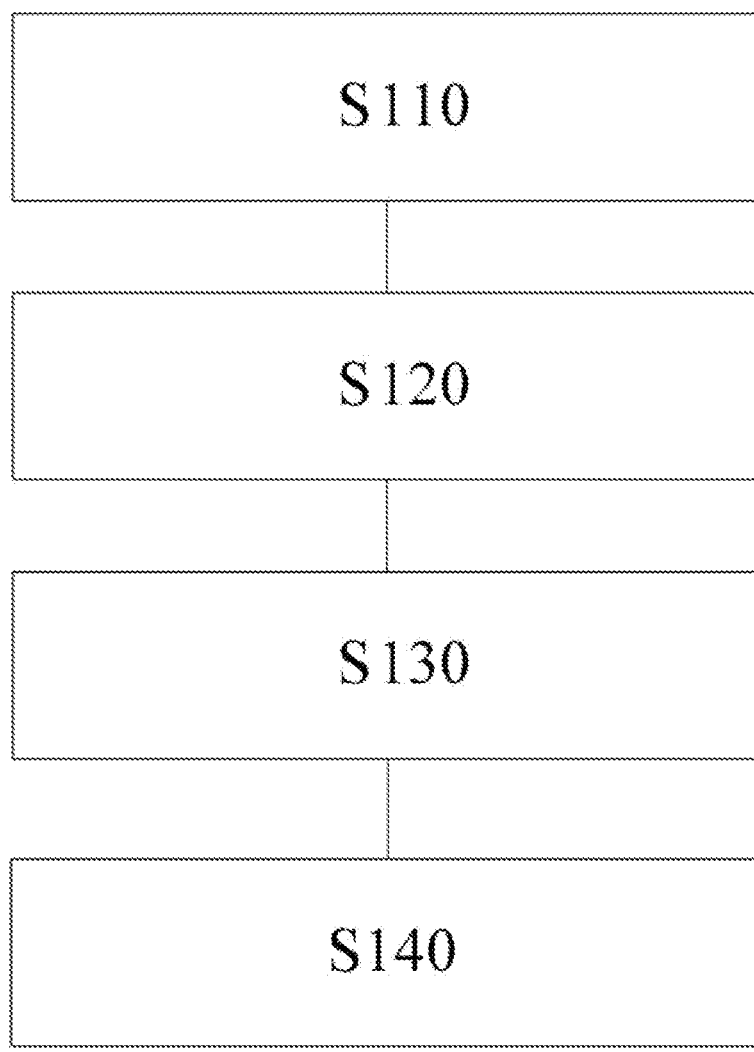
FIG. 1 shows a schematic flow chart of a three-dimensional environment analysis method according to an embodiment of the present disclosure.

FIG. 1 shows a schematic flow chart of a three-dimensional environment analysis method 1000 according to an embodiment of the present disclosure. As shown in FIG. 1, the method 1000 comprises the following steps.

In step S110, original point cloud data of a working environment is received;

in step S120, a map constructed on the basis of the original point cloud data is processed, in order to separate out ground surfaces, wall surfaces and obstacles in the working environment;

in step S130, the ground surfaces are paired with the wall surfaces according to the degree of proximity between the ground surfaces and wall surfaces that are separated out, to form one or more adjacent ground-wall pair sets; and in step S140, the one or more adjacent ground-wall pair sets are subjected to ray tracing analysis, in order to obtain a line-of-sight zone and a non-line-of-sight zone in the working environment.

In the context of the present disclosure, the term "working environment" means any environment in which a wireless sensor system or wireless signal propagation system has been installed or is to be installed.

The term "point cloud" means a set of points obtained after acquiring spatial coordinates of each sampling point on the surface of an object. In one embodiment, "point cloud data" can include information such as two-dimensional coordinates (XY) or three-dimensional coordinates (XYZ), laser reflection intensity and colour information (RGB). "Original point cloud data" is point cloud data that has not undergone pre-processing. In one embodiment, original point cloud data may be generated by a laser detection and ranging system (LiDAR) or a depth camera (e.g. RGB-D camera).

In the context of the present disclosure, the term "obstacle" is in relation to "wall surface" and "ground surface", and means any object other than a wall surface or ground surface in the working environment in which the wireless sensor system is set up.

The term "line-of-sight" is also called visible range (LOS), and the term "non-line-of-sight" is also called non-visible range (NLOS). In terms of name, they denote line-of-sight transmission and non-line-of-sight transmission of wireless signals respectively. In actual mobile communication network schemes, most environments can be divided into LOS and NLOS.

Under LOS conditions, a wireless signal is propagated in a "straight line" between a sending end and a receiving end without obstruction, and this requires that no object presenting an obstruction to radio waves be present within the first Fresnel zone; if the conditions are not met, there will be an obvious drop in signal strength. The size of the Fresnel zone depends on the frequency of the radio waves and the distance between the transmitter and receiver. In the case where an obstacle is present, the wireless signal can only reach the receiving end by reflection, scattering and diffraction; this is called NLOS, i.e. non-line-of-sight transmission/non-visible-range transmission. In this case the wireless signal is received via multiple pathways, and the multipath effect will give rise to a series of problems such as asynchronous delays, signal attenuation, changes in polarization and link instability.

In the context of the present disclosure, the term "line-of-sight zone" means a specific ground surface region in the working environment, wherein, when a mobile object is moving in this region, wireless signal propagation between a sensor or anchor mounted on a wall surface (e.g. an anchor in a UWB system) and the mobile object (i.e. tracked object) is line-of-sight transmission. Similarly, the meaning of the term "non-line-of-sight zone" is the opposite of "line-of-sight zone": when a tracked object is moving in a non-line-of-sight zone, wireless signal propagation between a sensor or anchor mounted on a wall surface (e.g. an anchor in a UWB system) and the tracked object is non-line-of-sight transmission.

Through the three-dimensional environment analysis method described above, by subjecting one or more adjacent ground-wall pair sets to ray tracing analysis, it is possible to obtain line-of-sight zones and non-line-of-sight zones in the working environment, to indicate ideal anchor point positions capable of minimizing the number of non-line-of-sight zones, thereby helping the user to set up the wireless sensor system faster and more conveniently.

In one embodiment, step S110 may comprise: receiving original point cloud data generated by a laser detection and ranging system (LiDAR) or a depth camera (e.g. RGB-D camera), and loading the original point cloud data into a database. In one embodiment, the original point cloud data may be generated by a SLAM (simultaneous localization and mapping) technique based on laser radar. The emergence and popularization of laser radar has made measurement quicker and more precise, and information is more abundant. Object information collected by laser radar is presented as a series of dispersed points having accurate angle and distance information, called a point cloud. In general, a laser SLAM system calculates changes in attitude and distance of relative movement of laser radar by matching and comparing two point clouds at different moments, thus accomplishing the positioning of the robot itself. Laser radar ranging is relatively accurate, the error model is simple, operation is stable in environments not directly irradiated by strong light, and point cloud processing is relatively easy. At the same time, the point cloud information itself contains direct geometric relationships, making robot path planning and navigation visually direct.

In one embodiment, step S120 may comprise: using a SLAM (simultaneous localization and mapping) technique to process the original point cloud data so as to construct a 3D map of the working environment; subjecting the map to pre-processing, in order to remove noise and/or abnormal values; and segmenting the pre-processed map, in order to extract ground surfaces, wall surfaces and obstacles in the working environment. In one embodiment, the 3D map of the working environment is pre-processed by means of a function provided by the Point Cloud Library (PCL), in order to remove noise and/or abnormal values. In one embodiment, functions such as RANSAC and Euclidean clustering in the PCL are used to segment the pre-processed map, in order to extract ground surfaces, wall surfaces and obstacles in the working environment.

RANSAC means random sample consensus, and chiefly solves the problem of outliers in samples; at most, it can process 50% of outlier situations. The basic idea of RANSAC is to achieve the objective by repeatedly selecting a random subset in the data. The selected subset is hypothesized to be inliers, and verification is performed by the following method: (1) there is a model suitable for the hypothetical inliers, i.e. all unknown parameters can be calculated from the hypothetical inliers; (2) the model obtained in the $1^{st}$ step is used to test all of the other data, and if a certain point is suitable for the estimated model, then that point is also regarded as an inlier; (3) if a sufficiently large number of points are classified as hypothetical inliers, then the estimated model is sufficiently rational; (4) all of the hypothetical inliers are used to re-estimate the model, because it was estimated only by the initial hypothetical inliers; (5) the model is evaluated by estimating the error rate of the inliers and the model.

The process described above is repeated a fixed number of times; the model generated each time is either rejected because the number of inliers is too small, or selected on account of being better than the existing model. The RANSAC algorithm is exceptionally suitable for the detection of certain objects having a distinctive external form from a disorderly point cloud.

Euclidean clustering is a clustering algorithm based on the Euclidean distance metric. For Euclidean clustering, the standard for judgement of distance is the Euclidean distance. For a point p in space, k points which are closest to point p are found by a KD-Tree nearest neighbor search algorithm, and from among these points, those for which the distance is less than a set threshold are clustered in a set Q. If the number of elements in Q is not increasing, the entire clustering process ends; otherwise it is necessary to select a point other than point p in Q, and repeat the above process until the number of elements in Q is not increasing.

In step S130, the ground surfaces are paired with the wall surfaces according to the degree of proximity between the ground surfaces and wall surfaces that are separated out, to form one or more adjacent ground-wall pair sets. For example, the various partitioned ground surfaces and wall surfaces are paired according to the degree of proximity between reference planes and points of the ground surfaces and wall surfaces. In other words, when the degree of proximity of a ground surface and a wall surface is greater than a threshold S, the ground surface and wall surface are paired.

In one embodiment, step S140 may comprise: for each of n wall points on the wall surface in each pair set, tracing m light rays from said each wall point to m points on the ground surface in said each pair set; if no obstacle and no wall surface is encountered in the course of transmission of a first of the m light rays, then said first light ray is identified as being line-of-sight transmitted; and if an obstacle or wall surface is encountered in the course of transmission of a second of them light rays, then said second light ray is identified as being non-line-of-sight transmitted. In one embodiment, step S140 may further comprise: for each of the n wall points, acquiring the numbers and lengths of light rays identified as being line-of-sight transmitted and non-line-of-sight transmitted respectively.

Although not shown in FIG. 1, in one embodiment, the three-dimensional environment analysis method 1000 may further comprise: visualizing the ground surfaces, wall surfaces and obstacles in a graphical user interface for a user to browse and mark. The user can use a measurement tool similar to a CAD program to determine distances and angles between geometric features of a reconstructed environment, and mark 3-D positions and regions on a virtual layout for subsequent NLOS analysis, and select anchor point/sensor installation.

In one embodiment, the three-dimensional environment analysis method 1000 may further comprise: for a three-dimensional point or three-dimensional region in the working environment that is selected by the user, graphically displaying the line-of-sight zone and non-line-of-sight zone.

In one embodiment, the three-dimensional environment analysis method 1000 may further comprise: based on the ray tracing analysis, calculating and outputting an ideal anchor point position on the wall surface, the ideal anchor point position being capable of minimizing the number of non-line-of-sight situations in a pre-selected region in the entire working environment. This provides a visual output and a textual output (e.g. 3-D coordinates in a text file) in a virtual environment layout.

In one embodiment, the three-dimensional environment analysis method 1000 may further comprise: based on the ray tracing analysis (e.g. at least based on the numbers and lengths of line-of-sight transmitted and non-line-of-sight transmitted light rays), providing a statistical analysis of the relationship between the number/installation positions etc. of deployed anchor points on the wall surface and the area ratio of the non-line-of-sight region to the line-of-sight region.

The user can also specify multiple constraint conditions, e.g. the number of anchors/sensors to be deployed, the minimum/maximum permitted anchor/sensor mounting height, etc. One or more of the above embodiments can take into account these constraint conditions in output and display. In one embodiment, the ideal anchor point position on the wall surface is calculated and outputted on the basis of the ray tracing analysis in conjunction with limiting conditions set by the user.

The user may also be permitted, in the graphical user interface, to specify a final anchor/sensor position according to the above analysis. Once the final position has been specified, the user is provided with step-by-step visual guidance, in order to install a single anchor in the 3-D layout. It is also possible to display a virtual recommendation and the distance to the next visual boundary marker (e.g. an edge and a ground surface), etc. For example, the user is recommended to "install anchor 1 on wall 1, said anchor 1 being installed 5 meters above the ground surface and 0.8 meters from a left edge". In addition, it may also be permitted to export all visualized and analysis results in the form of images or text, for sharing and recording.

Figure 2:
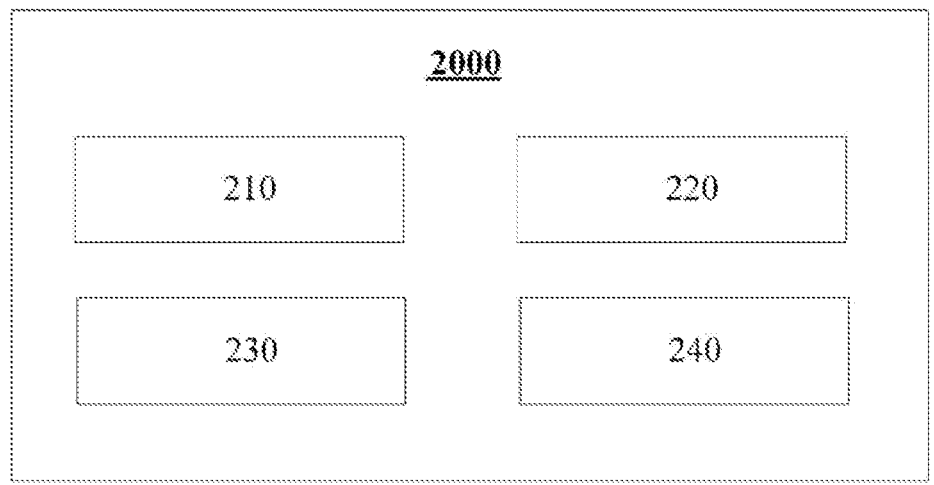
FIG. 2 shows a structural schematic diagram of a three-dimensional environment analysis device according to an embodiment of the present disclosure.

Referring to FIG. 2, FIG. 2 shows a structural schematic diagram of a three-dimensional environment analysis device 2000 according to an embodiment of the present disclosure. As shown in FIG. 2, the three-dimensional environment analysis device 2000 comprises a receiving module 210, a processing module 220, a pairing module 230 and an analysis module 240. The receiving module 210 is configured to receive original point cloud data of a working environment; the processing module 220 is configured to process a map constructed on the basis of the original point cloud data, in order to separate out ground surfaces, wall surfaces and obstacles in the working environment; the pairing module 230 is configured to pair the ground surfaces with the wall surfaces according to the degree of proximity between the ground surfaces and wall surfaces that are separated out, to form one or more adjacent ground-wall pair sets; and the analysis module 240 is configured to subject the one or more adjacent ground-wall pair sets to ray tracing analysis, in order to obtain a line-of-sight zone and a non-line-of-sight zone in the working environment.

In the context of the present disclosure, the term "working environment" means any environment in which a wireless sensor system or wireless signal propagation system has been installed or is to be installed.

The term "point cloud" means a set of points obtained after acquiring spatial coordinates of each sampling point on the surface of an object. In one embodiment, "point cloud data" can include information such as two-dimensional coordinates (XY) or three-dimensional coordinates (XYZ), laser reflection intensity and colour information (RGB). "Original point cloud data" is point cloud data that has not undergone pre-processing. In one embodiment, original point cloud data may be generated by a laser detection and ranging system (LiDAR) or a depth camera (e.g. RGB-D camera).

In the context of the present disclosure, the term "obstacle" is in relation to "wall surface" and "ground surface", and means any object other than a wall surface or ground surface in the working environment in which the wireless sensor system is set up.

The term "line-of-sight" is also called visible range (LOS), and the term "non-line-of-sight" is also called non-visible range (NLOS). In terms of names, they denote line-of-sight transmission and non-line-of-sight transmission of wireless signals respectively. In actual mobile communication network schemes, most environments can be divided into LOS and NLOS.

Under LOS conditions, a wireless signal is propagated in a "straight line" between a sending end and a receiving end without obstruction, and this requires that no object presenting an obstruction to radio waves be present within the first Fresnel zone; if the conditions are not met, there will be an obvious drop in signal strength. The size of the Fresnel zone depends on the frequency of the radio waves and the distance between the transmitter and receiver. In the case where an obstacle is present, the wireless signal can only reach the receiving end by reflection, scattering and diffraction; this is called NLOS, i.e. non-line-of-sight transmission/non-visible-range transmission. In this case the wireless signal is received via multiple pathways, and the multipath effect will give rise to a series of problems such as asynchronous delays, signal attenuation, changes in polarization and link instability.

The term "line-of-sight zone" means a specific ground surface region in the working environment, wherein, when a mobile object is moving in this region, wireless signal propagation between a sensor or anchor mounted on a wall surface (e.g. an anchor in a UWB system) and the mobile object (i.e. tracked object) is line-of-sight transmission. Similarly, the meaning of the term "non-line-of-sight zone" is the opposite of "line-of-sight zone": when a tracked object is moving in a non-line-of-sight zone, wireless signal propagation between a sensor or anchor mounted on a wall surface (e.g. an anchor in a UWB system) and the tracked object is non-line-of-sight transmission.

Through the three-dimensional environment analysis device 2000 described above, by subjecting one or more adjacent ground-wall pair sets to ray tracing analysis via the analysis module 240, it is possible to obtain line-of-sight zones and non-line-of-sight zones in the working environment, to indicate ideal anchor point positions capable of minimizing the number of non-line-of-sight zones, thereby helping the user to set up the wireless sensor system faster and more conveniently.

In one embodiment, the receiving module 210 is configured to receive original point cloud data generated by a laser detection and ranging system (LiDAR) or a depth camera (e.g. RGB-D camera), and load the original point cloud data into a database. In one embodiment, the original point cloud data may be generated by a SLAM (simultaneous localization and mapping) technique based on laser radar. The emergence and popularization of laser radar has made measurement quicker and more precise, and information is more abundant. Object information collected by laser radar is presented as a series of dispersed points having accurate angle and distance information, called a point cloud. In general, a laser SLAM system calculates changes in attitude and distance of relative movement of laser radar by matching and comparing two point clouds at different moments, thus accomplishing the positioning of the robot itself. Laser radar ranging is relatively accurate, the error model is simple, operation is stable in environments not directly irradiated by strong light, and point cloud processing is relatively easy. At the same time, the point cloud information itself contains direct geometric relationships, making robot path planning and navigation visually direct.

In one embodiment, the processing module 220 comprises a constructing module, a pre-processing module and a point cloud segmenting module, wherein the constructing module is configured to use a SLAM (simultaneous localization and mapping) technique to process the original point cloud data so as to construct a 3D map of the working environment; the pre-processing module is configured to subject the map to pre-processing, in order to remove noise and/or abnormal values; and the point cloud segmenting module is configured to segment the pre-processed map, in order to extract ground surfaces, wall surfaces and obstacles in the working environment.

In one embodiment, the pre-processing module pre-processes the 3D map of the working environment by means of a function provided by the Point Cloud Library (PCL), in order to remove noise and/or abnormal values. In one embodiment, the point cloud segmenting module uses functions such as RANSAC and Euclidean clustering in the PCL to segment the pre-processed map, in order to extract ground surfaces, wall surfaces and obstacles in the working environment.

RANSAC means random sample consensus, and chiefly solves the problem of outliers in samples; at most, it can process 50% of outlier situations. The basic idea of RANSAC is to achieve the objective by repeatedly selecting a random subset in the data. The selected subset is hypothesized to be inliers, and verification is performed by the following method: (1) there is a model suitable for the hypothetical inliers, i.e. all unknown parameters can be calculated from the hypothetical inliers; (2) the model obtained in the $1^{st}$ step is used to test all of the other data, and if a certain point is suitable for the estimated model, then that point is also regarded as an inlier; (3) if a sufficiently large number of points are classified as hypothetical inliers, then the estimated model is sufficiently rational; (4) all of the hypothetical inliers are used to re-estimate the model, because it was estimated only by the initial hypothetical inliers; (5) the model is evaluated by estimating the error rate of the inliers and the model.

The process described above is repeated a fixed number of times; the model generated each time is either rejected because the number of inliers is too small, or selected on account of being better than the existing model. The RANSAC algorithm is exceptionally suitable for the detection of certain objects having a distinctive external form from a disorderly point cloud.

Euclidean clustering is a clustering algorithm based on the Euclidean distance metric. For Euclidean clustering, the standard for judgement of distance is the Euclidean distance. For a point p in space, k points which are closest to point p are found by a KD-Tree nearest neighbor search algorithm, and from among these points, those for which the distance is less than a set threshold are clustered in a set Q. If the number of elements in Q is not increasing, the entire clustering process ends; otherwise it is necessary to select a point other than point p in Q, and repeat the above process until the number of elements in Q is not increasing.

The pairing module 230 is configured to pair the ground surfaces with the wall surfaces according to the degree of proximity between the ground surfaces and wall surfaces that are separated out, to form one or more adjacent ground-wall pair sets. For example, the pairing module 230 pairs the various partitioned ground surfaces and wall surfaces according to the degree of proximity between reference planes and points of the ground surfaces and wall surfaces. In other words, when the degree of proximity of a ground surface and a wall surface is greater than a threshold S, the pairing module 230 pairs the ground surface and wall surface.

In one embodiment, the analysis module 240 is configured to trace, for each of n wall points on the wall surface in each pair set, m light rays from said each wall point to m points on the ground surface in said each pair set; if no obstacle and no wall surface is encountered in the course of transmission of a first of them light rays, then said first light ray is identified as being line-of-sight transmitted; and if an obstacle or wall surface is encountered in the course of transmission of a second of the m light rays, then said second light ray is identified as being non-line-of-sight transmitted. In one embodiment, the analysis module 240 is further configured to acquire, for each of the n wall points, the numbers and lengths of light rays identified as being line-of-sight transmitted and non-line-of-sight transmitted respectively.

Although not shown in FIG. 2, in one embodiment, the three-dimensional environment analysis device 2000 may further comprise a first graphical display module, which visualizes the ground surfaces, wall surfaces and obstacles in a graphical user interface for a user to browse and mark. The user can use a measurement tool similar to a CAD program to determine distances and angles between geometric features of a reconstructed environment, and mark 3-D positions and regions on a virtual layout for subsequent NLOS analysis, and select anchor point/sensor installation.

In one embodiment, the three-dimensional environment analysis device 2000 may further comprise a second graphical display module which, for a three-dimensional point or three-dimensional region in the working environment that is selected by the user, graphically displays the line-of-sight zone and non-line-of-sight zone.

In one embodiment, the three-dimensional environment analysis device 2000 may further comprise a calculating module which, based on the ray tracing analysis, calculates and outputs an ideal anchor point position on the wall surface, the ideal anchor point position being capable of minimizing the number of non-line-of-sight situations in a pre-selected region in the entire working environment. This provides a visual output and a textual output (e.g. 3-D coordinates in a text file) in a virtual environment layout.

In one embodiment, the three-dimensional environment analysis device 2000 may further comprise a statistical analysis module which, based on the ray tracing analysis (e.g. at least based on the numbers and lengths of line-of-sight transmitted and non-line-of-sight transmitted light rays), provides a statistical analysis of the relationship between the number/installation positions etc. of deployed anchor points on the wall surface and the area ratio of the non-line-of-sight region to the line-of-sight region.

The user can also specify multiple constraint conditions, e.g. the number of anchors/sensors to be deployed, the minimum/maximum permitted anchor/sensor mounting height, etc. For example, the second graphical display module, the calculating module and/or the statistical analysis module can take into account these constraint conditions in output and display. In one embodiment, the calculating module calculates and outputs the ideal anchor point position on the wall surface on the basis of the ray tracing analysis in conjunction with limiting conditions set by the user.

In some embodiments, the three-dimensional environment analysis device 2000 may also permit the user, in the graphical user interface, to specify a final anchor/sensor position according to the above analysis. Once the final position has been specified, the user is provided with step-by-step visual guidance, in order to install a single anchor in the 3-D layout. It is also possible to display a virtual recommendation and the distance to the next visual boundary marker (e.g. an edge and a ground surface), etc. For example, the user is recommended to "install anchor 1 on wall 1, said anchor 1 being installed 5 meters above the ground surface and 0.8 meters from a left edge". In addition, it may also be permitted to export all visualized and analysis results in the form of images or text, for sharing and recording.

Those skilled in the art will readily appreciate that the three-dimensional environment analysis method provided in one or more embodiments of the present disclosure can be implemented by means of a computer program. For example, when a computer storage medium (e.g. a USB stick) having the computer program stored thereon is connected to a computer, the three-dimensional environment analysis method in an embodiment of the present disclosure can be executed by running the computer program.

In summary, the three-dimensional environment analysis solution of the present disclosure can use a two-dimensional or three-dimensional point cloud/network to automatically reconstruct an environment and segment walls/obstacles and ground surfaces, and automatically generate 2D and 3D layouts via the reconstruction and segmenting. By means of tools and a graphical user interface (GUI), it is possible to automatically and manually measure layout dimensions (e.g. metric system distances) and visualize layout geometric figures. Automatic ray tracing analysis is performed among all walls/obstacles and ground surface points, in order to perform qualitative and quantitative analysis of NLOS situations according to different anchor/sensor installation positions and constraint conditions. By means of tools and the GUI, it is also possible to perform user visual and statistical evaluation of LOS/NLOS situations on the basis of ray tracing data. It is also possible to set constraints (e.g. required anchor point/sensor positions, anchor point count, etc.).

In one or more embodiments, the three-dimensional environment analysis solution of the present disclosure can calculate and visually display optimal anchor/sensor installation positions in a wireless sensor system (e.g. a UWB positioning system comprising an anchor and a tag). A visual step-by-step guidance system can be used for anchor/sensor installation, i.e. displaying anchor/sensor positions and installation prompts (e.g. metric system distances from ground surfaces and walls, etc.). When new input data (point cloud or layout) is available, a tool can automatically be re-run, to generate an updated layout, display updated LOS/NLOS states, and provide a recommendation for device re-adjustment. All of these functions can significantly reduce the time needed for manual measurement, setting and re-adjustment resulting from environment changes or poor system performance.

The above examples chiefly explain the three-dimensional environment analysis solution of the present disclosure. Although only some of the embodiments of the present disclosure have been described, those skilled in the art will understand that the present disclosure can be implemented in many other forms without deviating from the substance and scope thereof. Thus, the examples and embodiments presented are regarded as schematic and non-limiting, and the present disclosure could include various amendments and substitutions without departing from the spirit and scope of the present disclosure as defined in the attached claims.

What is claimed is:

1. A three-dimensional environment analysis method, comprising:
  receiving original point cloud data of a working environment;
  processing a map constructed on the basis of the original point cloud data in order to separate out a ground surface, a wall surface and an obstacle in the working environment;
  pairing the ground surface with the wall surface according to the degree of proximity between the ground surface and wall surface that are separated out to form one or more adjacent ground-wall pair sets;
  subjecting the one or more adjacent ground-wall pair sets to ray tracing analysis in order to obtain a line-of-sight zone and a non-line-of-sight zone in the working environment; and
  based on the ray tracing analysis, calculating and outputting an ideal anchor point position on the wall surface, the ideal anchor point position is configured to minimize the number of non-line-of-sight situations in a pre-selected region in the entire working environment.

2. The method as claimed in claim 1, wherein the step of receiving original point cloud data of a working environment comprises:
  receiving original point cloud data generated by a laser detection and ranging system or a depth camera.

3. The method as claimed in claim 1, wherein the step of processing a map constructed on the basis of the original point cloud data comprises:
  using a simultaneous localization and mapping ("SLAM") technique to process the original point cloud data so as to construct a 3D map of the working environment;
  subjecting the map to pre-processing in order to remove noise and/or abnormal values; and segmenting the pre-processed map in order to extract a ground surface, a wall surface and an obstacle in the working environment.

4. The method as claimed in claim 1, wherein the step of subjecting the one or more adjacent ground-wall pair sets to ray tracing analysis comprises:
for each of n wall points on the wall surface in each pair set, tracing m light rays from said each wall point to m points on the ground surface in said each pair set;
if no obstacle and no wall surface is encountered in the course of transmission of a first of the m light rays, then said first light ray is identified as being line-of-sight transmitted; and
if an obstacle or wall surface is encountered in the course of transmission of a second of the m light rays, then said second light ray is identified as being non-line-of-sight transmitted.

5. The method as claimed in claim 4, wherein the step of subjecting the one or more adjacent ground-wall pair sets to ray tracing analysis further comprises:
for each of the n wall points, acquiring the numbers and lengths of light rays identified as being line-of-sight transmitted and non-line-of-sight transmitted respectively.

6. The method as claimed in claim 1, further comprising:
visualizing the ground surface, wall surface and obstacle in a graphical user interface for a user to browse and mark.

7. The method as claimed in claim 1, further comprising:
for a three-dimensional point or three-dimensional region in the working environment that is selected by a user, graphically displaying the line-of-sight zone and non-line-of-sight zone.

8. The method as claimed in claim 1, further comprising:
based on the ray tracing analysis, providing a statistical analysis of the relationship between the number/installation positions of deployed anchor points on the wall surface and the area ratio of the non-line-of-sight region to the line-of-sight region.

9. The method as claimed in claim 1, wherein the ideal anchor point position on the wall surface is calculated and outputted on the basis of the ray tracing analysis in conjunction with a limiting condition set by a user.

10. A three-dimensional environment analysis device, comprising:
a receiving module configured to receive original point cloud data of a working environment;
a processing module configured to process a map constructed on the basis of the original point cloud data in order to separate out a ground surface, a wall surface and an obstacle in the working environment;
a pairing module configured to pair the ground surface with the wall surface according to the degree of proximity between the ground surface and wall surface that are separated out to form one or more adjacent ground-wall pair sets;
an analysis module configured to subject the one or more adjacent ground-wall pair sets to ray tracing analysis in order to obtain a line-of-sight zone and a non-line-of-sight zone in the working environment; and
a calculating module configured to calculate and output an ideal anchor point position on the wall surface on the basis of the ray tracing analysis, the ideal anchor point position being configured to minimize the number of non-line-of-sight situations in a pre-selected region in the entire working environment.

11. The device as claimed in claim 10, wherein the receiving module is configured to receive original point cloud data generated by a laser detection and ranging system or a depth camera.

12. The device as claimed in claim 10, wherein the processing module comprises:
a constructing module configured to use a simultaneous localization and mapping ("SLAM") technique to process the original point cloud data so as to construct a 3D map of the working environment;
a pre-processing module configured to subject the map to pre-processing, in order to remove noise and/or abnormal values; and
a point cloud segmenting module configured to segment the pre-processed map in order to extract a ground surface, a wall surface and an obstacle in the working environment.

13. The device as claimed in claim 10, wherein:
the analysis module is configured to trace, for each of n wall points on the wall surface in each pair set, m light rays from said each wall point to m points on the ground surface in said each pair set;
if no obstacle and no wall surface is encountered in the course of transmission of a first of the m light rays, then said first light ray is identified as being line-of-sight transmitted; and
if an obstacle or wall surface is encountered in the course of transmission of a second of the m light rays, then said second light ray is identified as being non-line-of-sight transmitted.

14. The device as claimed in claim 13, wherein the analysis module is further configured to acquire, for each of the n wall points, the numbers and lengths of light rays identified as being line-of-sight transmitted and non-line-of-sight transmitted respectively.

15. The device as claimed in claim 10, further comprising:
a first graphical display module configured to visualize the ground surface, wall surface and obstacle in a graphical user interface for a user to browse and mark.

16. The device as claimed in claim 10, further comprising:
a second graphical display module configured to graphically display the line-of-sight zone and non-line-of-sight zone for a three-dimensional point or three-dimensional region in the working environment that is selected by a user.

17. The device as claimed in claim 10, further comprising:
a statistical analysis module configured to provide, based on the ray tracing analysis, a statistical analysis of the relationship between the number/installation positions of deployed anchor points on the wall surface and the area ratio of the non-line-of-sight region to the line-of-sight region.

18. The device as claimed in claim 10, wherein the calculating module is configured to calculate and output the ideal anchor point position on the wall surface on the basis of the ray tracing analysis in conjunction with a limiting condition set by a user.

* * * * *